United States Patent
Tetsuka

(10) Patent No.: US 10,300,984 B2
(45) Date of Patent: May 28, 2019

(54) BICYCLE ELECTRICAL UNIT FOR BICYCLE CRANK ASSEMBLY

(71) Applicant: Shimano Inc., Sakai, Osaka (JP)

(72) Inventor: Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/592,559

(22) Filed: May 11, 2017

(65) Prior Publication Data

US 2017/0247078 A1    Aug. 31, 2017

Related U.S. Application Data

(62) Division of application No. 14/722,662, filed on May 27, 2015, now Pat. No. 9,771,126.

(51) Int. Cl.
| | | |
|---|---|---|
| *B62M 3/00* | (2006.01) | |
| *B62J 6/00* | (2006.01) | |
| *B62K 19/34* | (2006.01) | |
| *B62M 3/16* | (2006.01) | |
| *B62J 99/00* | (2009.01) | |

(52) U.S. Cl.
CPC ............. *B62M 3/00* (2013.01); *B62J 6/003* (2013.01); *B62K 19/34* (2013.01); *B62M 3/16* (2013.01); *B62J 2099/002* (2013.01); *B62J 2099/0013* (2013.01); *B62K 2208/00* (2013.01)

(58) Field of Classification Search
CPC ... B62M 3/16; B62M 3/00; B62J 6/003; B62J 2300/0013; B62J 2300/002; B62K 19/34; B62K 2208/00
See application file for complete search history.

(56) References Cited

U.S. PATENT DOCUMENTS

| | | | |
|---|---|---|---|
| 5,027,303 A | 6/1991 | Witte | |
| 7,047,817 B2 | 5/2006 | Lanhan | |
| 7,806,006 B2 * | 10/2010 | Phillips | ............... G01L 3/1457 |
| | | | 280/259 |
| 7,861,599 B2 * | 1/2011 | Meggiolan | ............. B62M 3/003 |
| | | | 73/760 |
| 7,975,561 B1 | 7/2011 | Ambrosina et al. | |
| 8,006,574 B2 | 8/2011 | Meyer | |
| 8,065,926 B2 | 11/2011 | Meyer | |
| 8,505,393 B2 | 8/2013 | Meyer | |
| 8,800,389 B2 * | 8/2014 | Tetsuka | .................... B62M 3/00 |
| | | | 73/862 |
| 8,881,608 B2 | 11/2014 | Tetsuka et al. | |

(Continued)

FOREIGN PATENT DOCUMENTS

| | | |
|---|---|---|
| CN | 104354828 A | 2/2015 |
| CZ | 280 485 | 1/1996 |

(Continued)

OTHER PUBLICATIONS

U.S. Appl. No. 14/603,729, filed Jan. 23, 2015; Tetsuka et al.

*Primary Examiner* — Thomas C Diaz
(74) *Attorney, Agent, or Firm* — Global IP Counselors, LLP

(57) ABSTRACT

A bicycle electrical unit is provided for a bicycle crank assembly. The bicycle electrical unit includes a housing, a wireless communication unit and a charge receiver port. The housing is mounted on a crank arm. The wireless communication unit is enclosed in the housing. The charge receiver port is provided on the housing.

13 Claims, 13 Drawing Sheets

(56) References Cited

U.S. PATENT DOCUMENTS

| | | | |
|---|---|---|---|
| 9,010,201 B2 | 4/2015 | Kodama et al. | |
| 9,157,742 B1 * | 10/2015 | Fahrner | B62H 5/00 |
| 9,322,725 B2 * | 4/2016 | Tetsuka | G01L 3/247 |
| 2008/0236293 A1 | 10/2008 | Meggiolan | |
| 2010/0263468 A1 | 10/2010 | Fisher et al. | |
| 2012/0214646 A1 | 8/2012 | Lull et al. | |
| 2012/0330572 A1 | 12/2012 | Longman | |
| 2013/0019700 A1 | 1/2013 | Matsumoto | |
| 2013/0104650 A1 | 5/2013 | Bailey et al. | |
| 2013/0205916 A1 | 8/2013 | Kodama et al. | |
| 2013/0210583 A1 | 8/2013 | Kametani et al. | |
| 2014/0060212 A1 | 3/2014 | Tetsuka et al. | |
| 2016/0003696 A1 * | 1/2016 | Longman | B62M 3/00 |
| | | | 73/862.621 |

FOREIGN PATENT DOCUMENTS

| | | |
|---|---|---|
| WO | 2011/030215 A1 | 3/2011 |
| WO | 2012/056510 A1 | 5/2012 |
| WO | 2012/056522 A1 | 5/2012 |
| WO | 2013/017465 A2 | 2/2013 |
| WO | 2015//1095933 A1 | 7/2015 |

* cited by examiner

BICYCLE ELECTRICAL UNIT FOR BICYCLE CRANK ASSEMBLY

CROSS-REFERENCE TO RELATED APPLICATIONS

This application is a divisional application of U.S. patent application Ser. No. 14/722,662 filed on May 27, 2015.

BACKGROUND

Field of the Invention

This invention generally relates to a bicycle electrical unit and a bicycle crank assembly. More specifically, the present invention relates to a bicycle electrical unit that is configured to be disposed on a crank arm of a bicycle crank assembly.

Background Information

Bicycles are sometimes equipped with various sensors for providing information to a rider and/or for providing information to a controller to control various aspects of the bicycle, such as shifting or suspension stiffness. For example, pedaling force detectors typically use strain gauges to measure pedaling force during pedaling. Recently, pedaling force detectors have incorporated wireless communication technology or a battery unit disposed within a housing that is mounted on a portion of the bicycle, such as a crank arm. Some pedaling force detectors are also arranged to have sensor circuits detachably disposed a crank assembly, as disclosed in U.S. Patent Application Publication No. 2014/0060212 (assigned to Shimano). Sensor circuits may be configured to process pedaling force information detected by the strain gauges and transmit this information so that it is received by the rider.

SUMMARY

Generally, the present disclosure is directed to various features of a a bicycle electrical unit configured to be disposed on a crank arm of a bicycle crank assembly.

In view of the state of the known technology and in accordance with a first aspect of the present disclosure, a bicycle electrical unit is provided for a bicycle crank assembly. The bicycle electrical unit basically comprises a housing, a wireless communication unit and a charge receiver port. The housing is mounted on a crank arm. The wireless communication unit is enclosed in the housing. The charge receiver port is provided on the housing.

In accordance with a second aspect of the present invention, the bicycle electrical unit according to the first aspect further comprises a battery unit housed in the housing.

In accordance with a third aspect of the present invention, the bicycle electrical unit according to the first aspect further comprises a battery unit configured to be disposed inside of a crankshaft.

In accordance with a fourth aspect of the present invention, the bicycle electrical unit according to the first aspect further comprises a sensor configured to be disposed on the crank arm. The wireless communication unit is configured to receive information from the sensor.

In accordance with a fifth aspect of the present invention, the bicycle electrical unit according to the fourth aspect is configured so that the sensor includes at least one strain sensor.

In accordance with a sixth aspect of the present invention, the bicycle electrical unit according to the fourth aspect is configured so that the sensor includes a cadence sensor.

In accordance with a seventh aspect of the present invention, the bicycle electrical unit according to the first aspect is configured so that the housing is configured to be disposed circumferentially between first and second sprocket mounting arms of a sprocket mounting portion of the crank arm.

In accordance with an eighth aspect of the present invention, a bicycle crank assembly is provided that basically comprises a crank arm, a housing, a charge receiver port and a battery unit. The housing is to mounted on the crank arm. The wireless communication unit is enclosed in the housing. The charge receiver port is provided on the housing.

In accordance with a ninth aspect of the present invention, the bicycle crank assembly according to the eighth aspect further comprises a battery unit housed in the housing.

In accordance with a tenth aspect of the present invention, the bicycle crank assembly according to the eighth aspect further comprises a battery unit configured to be disposed inside of a crankshaft.

In accordance with an eleventh aspect of the present invention, the bicycle crank assembly according to the eighth aspect further comprises a sensor configured to be disposed on the crank arm. The wireless communication unit is configured to receive information from the sensor.

In accordance with a twelfth aspect of the present invention, the bicycle crank assembly according to the eleventh aspect is configured so that the sensor includes at least one strain sensor.

In accordance with a thirteenth aspect of the present invention, the bicycle crank assembly according to the eleventh aspect is configured so that the sensor includes a cadence sensor.

In accordance with a fourteenth aspect of the present invention, the bicycle crank assembly according to the eighth aspect is configured so that the crank arm includes a crank portion and a sprocket mounting portion. The sprocket mounting portion includes a first sprocket mounting arm and a second mounting arm. The housing is configured to be disposed circumferentially between the first sprocket mounting arm and second sprocket mounting arm.

In accordance with a fifteenth aspect of the present invention, a bicycle crank assembly is provided that basically comprises a crank arm, a crankshaft, a charge receiver port and a battery unit. The crankshaft is connected to the crank arm. The charge receiver port is disposed on the crank arm. The battery unit is disposed inside the crankshaft.

In accordance with a sixteenth aspect of the present invention, the bicycle crank assembly according to the fifteenth aspect further comprises a housing mounted on the crank arm. The charge receiver port is provided on the housing.

Also, other objects, features, aspects and advantages of the disclosed bicycle electrical unit will become apparent to those skilled in the art from the following detailed description, which, taken in conjunction with the annexed drawings, discloses one embodiment of the bicycle electrical unit.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
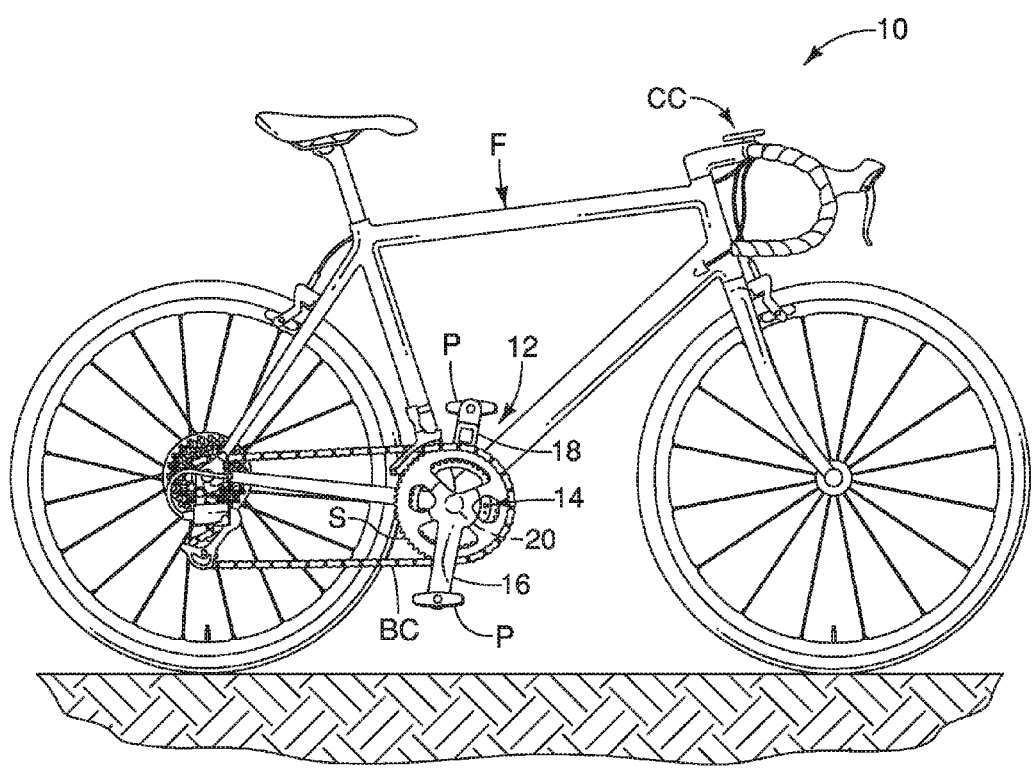
FIG. 1 is a side elevational view of a bicycle that is equipped with a bicycle crank assembly having a bicycle electrical unit in accordance with a first illustrated embodiment.

Referring initially to FIG. 1, a bicycle 10 is illustrated that is equipped with a bicycle crank assembly 12 having a bicycle electrical unit 14 in accordance with a first embodiment. The bicycle crank assembly 12 is rotatably mounted to a bicycle frame F of the bicycle 10 in a conventional manner. As shown in FIG. 1, the bicycle 10 is a road style bicycle that includes various electrically-controlled components. Of course, it will be apparent to those skilled in the art from this disclosure that the electrical unit 14 can be used with other types of bicycles. As shown, the bicycle crank assembly 12 includes a first crank arm 16 and a second crank arm 18. In the first illustrated embodiment, the first crank arm 16 is a right crank arm and the second crank arm 18 is a left crank arm. Two bicycle sprockets S1 and S2 are mounted on to the first crank arm 16 for driving a bicycle chain BC.

Figure 2:
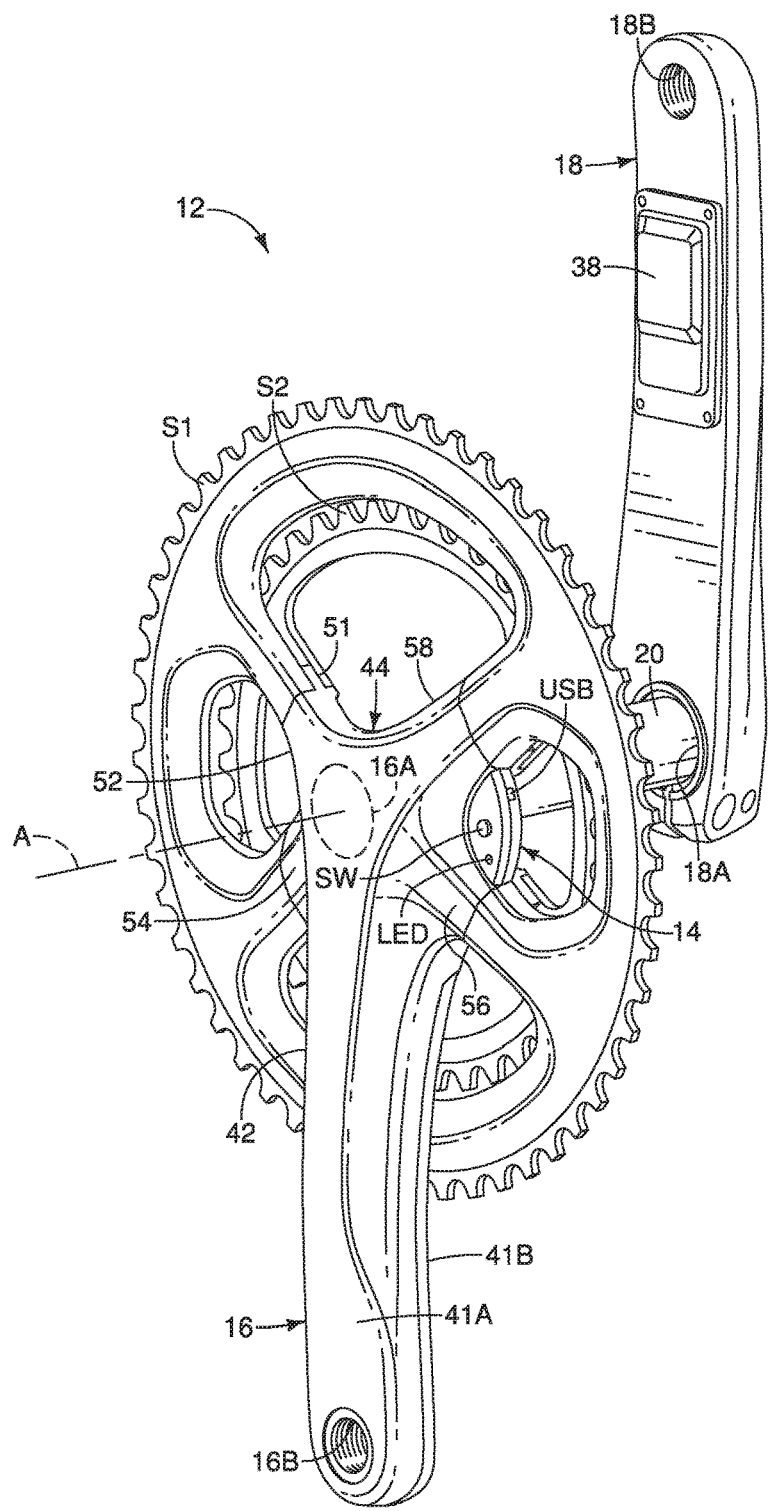
FIG. 2 is an outside perspective view of the bicycle crank assembly illustrated in FIG. 1 showing the bicycle electrical unit disposed on a sprocket mounting portion of a right crank arm.
Figure 3:
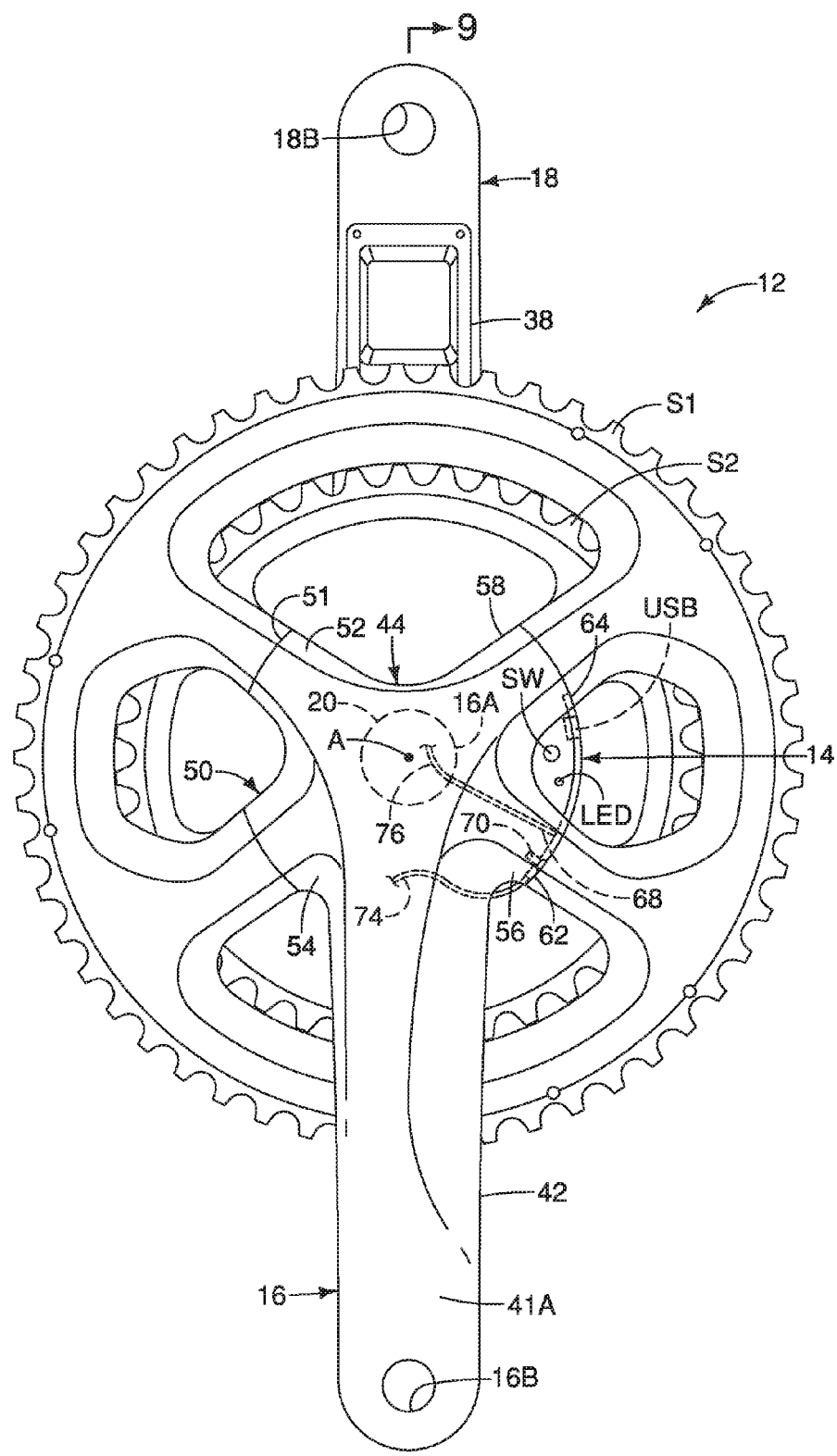
FIG. 3 is an outside elevational view of the bicycle crank assembly illustrated in FIGS. 1 and 2 with the bicycle electrical unit disposed on the sprocket mounting portion of the right crank arm.
Figure 4:
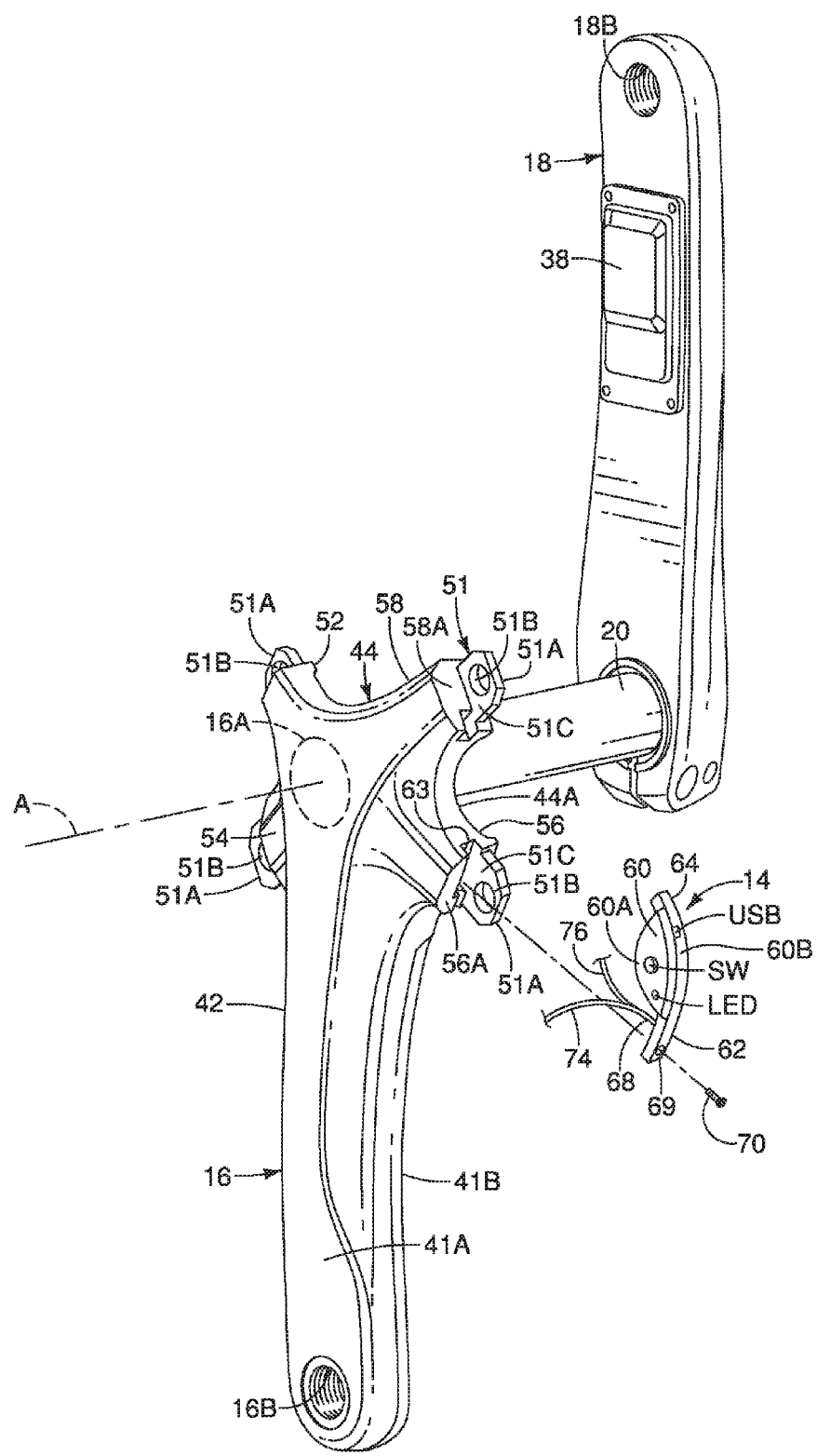
FIG. 4 is an outside elevational view of the bicycle crank arm assembly illustrated in FIGS. 1 to 3 with the sprockets removed and the electrical unit exploded to show the attachment of the bicycle electrical unit on the sprocket mounting portion of the right crank arm.

As seen in FIGS. 2 to 4, the bicycle crank assembly 12 further includes a crankshaft 20. The crankshaft 20 is connected to the first crank arm 16 and the second crank arm 16. Specifically, the first and second crank arms 16 and 18 are fixedly coupled to the crankshaft 20 such that the first and second crank arms 16 and 18 extend perpendicularly from the crankshaft 20 in opposite directions.

Specifically, the first crank arm 16 has a crankshaft receiving opening 16A which non-rotatably mates with a first end of the crankshaft 20. The first crank arm 16 is non-removably attached to the first end of the crankshaft 20. The second crank arm 18 has a crankshaft receiving opening 18A which non-rotatably mates with a second end of the crankshaft 20. The second crank arm 18 is attached to the second end of the crankshaft 20 in a releasable and reinstallable manner. As seen in FIGS. 3 and 4, the crankshaft receiving openings 16A and 18A have their centers located on a longitudinal center axis of the crankshaft 20 which defines a rotational axis or crank axis A of the bicycle crank assembly 12. The free ends of the first and second crank arms 16 and 18 are each provided with a bicycle pedal P. In particular, as best seen in FIG. 2, the first crank arm 16 has a threaded opening 16B for attaching one of the bicycle pedals P (FIG. 1) in a conventional manner. Likewise, the second crank arm 18 has a threaded opening 18B for attaching another bicycle pedal P. When a rider applies a pedaling force on the bicycle pedals P, a pedaling force is transmitted to the first and second crank arms 16 and 18, which rotate the bicycle sprockets S1 and S2 to move the bicycle chain BC and propel the bicycle 10 in a conventional manner.

As explained hereinafter, in the first illustrated embodiment, the electrical unit 14 is configured to supply electrical power to a pedaling force detector 22 and transmit data signals from the pedaling force detector 22 to a cycle computer CC as explained below. Here, in the first illustrated embodiment, the electrical unit 14 is installed on the first crank arm 16. The pedaling force detector 22 detects a pedaling force applied to the first and second crank arms 16 and 18 and provides pedaling force information to be conveyed to a rider via the cycle computer CC. While the bicycle crank assembly 12 is illustrated with many parts, the bicycle crank assembly 12 basically comprises the bicycle crank arm 16 and the electrical unit 14.

Figure 5:
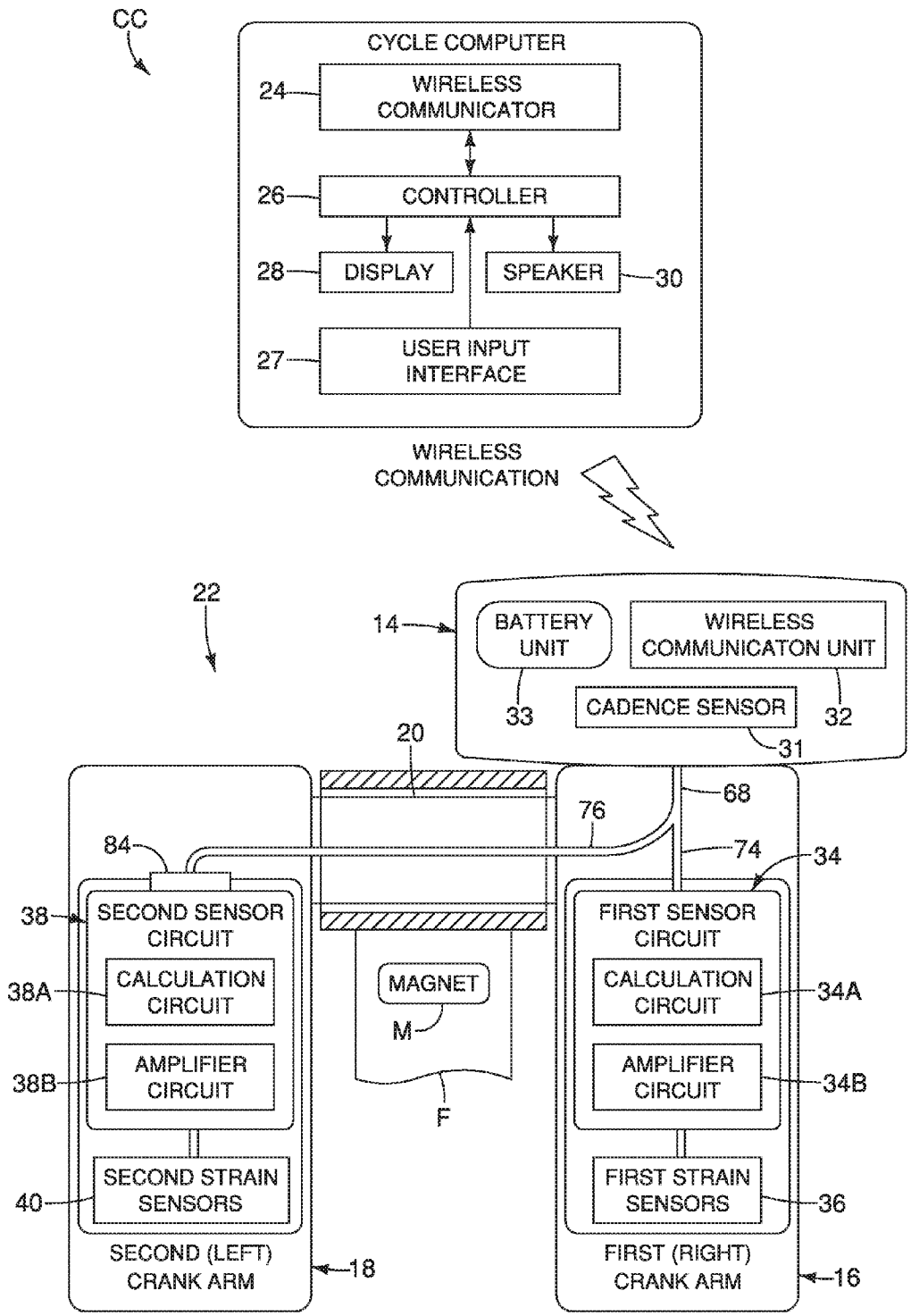
FIG. 5 is a block diagram of a bicycle sensor unit that is disposed the bicycle crank assembly of FIGS. 1 to 3 having a first sensor circuit mounted on a first bicycle crank arm, a second sensor circuit mounted on a second bicycle crank arm, and the bicycle electrical unit electrically connected to the first and second sensor circuits and in wireless communication with a cycle computer.

Referring now to FIG. 5, a block diagram of the bicycle crank assembly 12 is illustrated. In the first illustrated embodiment, the cycle computer CC comprises a two-way wireless communicator 24 (i.e., a wireless receiver-wireless transmitter) and a controller 26. The controller 26 is a microcomputer that includes a central processing unit (CPU) or processor and other conventional components such as an input interface circuit, an output interface circuit, and storage devices such as ROM (Read Only Memory) device and RAM (Random Access Memory) device. Typically, the cycle computer CC includes a user interface 27, a display 28 and a speaker 30. Also the controller 26 is programmed to display the pedaling force information on the display 28. The controller 26 can include other programs as needed and/or desired. For example, the controller 26 can include an automatic shifting program for automatically shifting gears of the bicycle 10 based on the pedaling force information and/or other bicycle riding conditions that are detected with other sensors (not shown).

Still referring to FIG. 5, preferably, the cycle computer CC includes other conventional parts such as a replaceable battery (not shown). While the wireless communicator 24 and the controller 26 are illustrated as a part of the cycle computer CC, the wireless communicator 24 and the controller 26 can be provided separately from the cycle computer CC. For example, alternatively, the wireless communicator 24 can be connected to the cycle computer CC by one or more communication cords. It will be apparent to those skilled in the art from this disclosure that many types of wireless communicator 24 can be used for receiving the pedaling force information. Thus, the cycle computer CC will not be discussed and/or illustrated in detail herein.

Basically, as seen in FIG. 5, the electrical unit 14 includes a cadence sensor 31, a wireless communication unit 32, a battery unit 33. The cadence sensor 31 (e.g., a reed switch) detects a magnetic field of a magnet M that is attached to the bicycle 10. The cadence sensor 31 is electrically connected to the wireless communication unit 32. The wireless communication unit 32 is configured to wirelessly output cadence information received from the cadence sensor 31 to the cycle computer CC. Alternatively, the cadence sensor 31 can be mounted at any suitable location to detect the magnetic field of the magnet M. The battery unit 33 is electrically connected to the pedaling force detector 22 and the wireless communication unit 32 for supply electrical power to the pedaling force detector 22 and the wireless communication unit 32.

Basically, as seen in FIG. 5, the pedaling force detector 22 basically includes a first sensor circuit 34 and a plurality of first strain sensors 36 for measuring the pedaling force applied to the first crank arm 16. The pedaling force detector 22 further includes a second sensor circuit 38 and a plurality of second strain sensors 40 for measuring the pedaling force applied to the second crank arm 18. The electrical unit 14 is electrically connected to the first and second sensor circuits 34 and 38 for receiving signals indicative of the pedaling force applied to the first and second crank arms 16 and 18. In this way, the pedaling force detector 22 is in wireless communication with the cycle computer CC via the wireless communication unit 32 of the electrical unit 14 to provide pedaling force information to the rider.

In the illustrated embodiment, the first sensor circuit 34 is detachably mounted on the first crank arm 16, while the second sensor circuit 38 is detachably mounted on the second crank arm 18. The first sensor circuit 34 is electrically connected to the first strain sensors 36 that are also mounted on the first crank arm 16. The second sensor circuit 38 is electrically connected to the second strain sensors 40 that are also mounted on the second crank arm 18. The wireless communication unit 32 is electrically connected to the first and second sensor circuits 34 and 38. The first sensor circuit 34 is a device that amplifies a strain signal received from and detected by the first strain sensors 36, and then transforms the strain signal into a data signal indicative of the pedaling force applied to the first crank arm 16. Similarly, the second sensor circuit 38 amplifies a strain signal received from and detected by the second strain sensors 40, and then transforms the strain signal into a data signal indicative of the pedaling force applied to the second crank arm 18. In other words, the first and second sensor circuits 34 and 38 interpret the strain signal(s) to generate pedaling force information that is transmitted to the cycle computer CC via the wireless communication unit 32.

In particular, as shown in FIG. 5, the first sensor circuit 34 includes a first calculation circuit 34A and a first amplifier circuit 34B. Similarly, the second sensor circuit 38 includes a second calculation circuit 38A and a second amplifier circuit 38B. The first and second amplifier circuits 34B and 38B amplifies signals received from the first and second strain sensors 36 and 39, respectively. The first and second calculation circuits 34A and 38A have processors that analyze the amplified signals received from the first and second amplifier circuits 34B and 38B, respectively. The analyzed signals are then transmitted to the wireless communication unit 32 of the electrical unit 14. Because the first and second calculation circuits 34A and 38A and the first and second amplifier circuits 34B and 38B are not important to the present invention, they will not be further discussed herein.

Referring now to FIGS. 6 to 10, the first crank arm 16 has a first surface 41A and a second surface 41B. The first surface 41A is an outside surface and the second surface 41B is an inside surface when the first crank arm 16 is installed onto the bicycle 10. The first bicycle crank arm 16 includes a crank portion 42 and a sprocket mounting portion 44. The crank portion 42 of the first crank arm 16 includes the threaded opening 16B for receiving the bicycle pedal P. In the illustrated embodiment, the first sensor circuit 34 and the first strain sensors 36 are mounted on the crank portion 42 of the first bicycle crank arm 16. Preferably, the first sensor circuit 34 and the first strain sensors 36 are mounted on the second (inside) surface 41B at the crank portion 42 of the first crank arm 16. The electrical unit 14 is disposed on the sprocket mounting portion 44 of the first crank arm 16. The electrical unit 14 houses the cadence sensor 31, the wireless communication unit 32 and the battery unit 33. The electrical unit 14 can house one or more other electrical components as needed and/or desired. The arrangement of the electrical unit 14 on the first crank arm 16 will be further discussed later.

The sprocket mounting portion 44 of the first crank arm 16 includes the crank axle receiving hole 16A for receiving the crankshaft 20. The sprocket mounting portion 44 further includes a sprocket mounting structure 51 having a plurality of distal end parts 51A. Each of the distal end parts 51A has a sprocket mounting hole 51B. Each of the distal end parts 51A of the sprocket mounting structure 51 defines a sprocket support surface 51C. The bicycle sprocket S1 is mounted on the distal end parts 51A. The sprocket mounting holes 51B are configured to receive securing devices (e.g., ring nuts and ring bolts) to fixedly mount the bicycle sprocket S1 to the sprocket mounting structure 51 a conventional manner. Thus, bicycle sprocket S1 is mounted on the sprocket mounting structure 51 at the sprocket mounting holes 51B.

In the first embodiment, the sprocket mounting portion 44 includes at least one sprocket mounting arm that supports the sprocket mounting structure 51. The at least one sprocket mounting arm has a distal end part forming the sprocket mounting structure 51. As shown in the first illustrated embodiment, the at least one sprocket mounting arm includes a plurality of sprocket mounting arms 52, 54, 56 and 58. Thus, the sprocket mounting portion 44 is a spider portion of the first crank arm 16. Hereinafter, the sprocket mounting arms 56 and 58 will be referred to as a first sprocket mounting arm and a second sprocket mounting arm, respectively. Thus, the at least one sprocket mounting arm includes the first sprocket mounting arm 56 and the second sprocket mounting arm 58. The second sprocket mounting arm 58 is located adjacent to the first sprocket mounting arm 56. As described below, the electrical unit 14 is disposed on the first and second sprocket mounting arms 56 and 58.

The first sprocket mounting arm 56 has a support surface 56A that is located adjacent the sprocket support surface 51C. The support surface 56A is configured to support a section of the electrical unit 14. As best seen in FIG. 4, the sprocket support surface 51C is substantially perpendicular with respect to the support surface 56A of the first sprocket mounting arm 56. Thus, in the illustrated embodiment, when the bicycle sprocket S1 is installed onto the sprocket mounting portion 44, a section of the electrical unit 14, which is disposed on the support surface 56A, is disposed between the support surface 56A and the bicycle sprocket S1.

Similarly, the second sprocket mounting arm 58 has a support surface 58A that is located adjacent the sprocket support surface 51C. The sprocket support surface 51C is substantially perpendicular with respect to the support surface 58A of the second sprocket mounting arm 58. Similar to the first sprocket mounting arm 56, when the bicycle sprocket S1 is installed onto the sprocket mounting portion 44, another section of the electrical unit 14, which is disposed on the support surface 58A, is disposed between the support surface 58A and the bicycle sprocket S1.

In the first illustrated embodiment, the electrical unit 14 includes a housing 60 that encloses the cadence sensor 31, the wireless communication unit 32, the battery unit 33 and other electrical components as needed and/or desired. In other words, the housing 60 supports at least one electrical component to be mounted on the sprocket mounting portion 44 of the first crank arm 16. In the first illustrated embodiment, the at least one electrical component includes the wireless communication unit 32. Also, in the first illustrated embodiment, the at least one electrical component also includes the battery unit 33. However, it will be apparent to those skilled in the art from this disclosure that the electrical unit 14 can be configured to either house only the wireless communication unit 32, or house only the battery unit 33. Thus, either one of the wireless communication unit 32 and the battery unit 33 can be configured to be mounted on the bicycle crank assembly 12 outside of the electrical unit 14.

Figure 7:
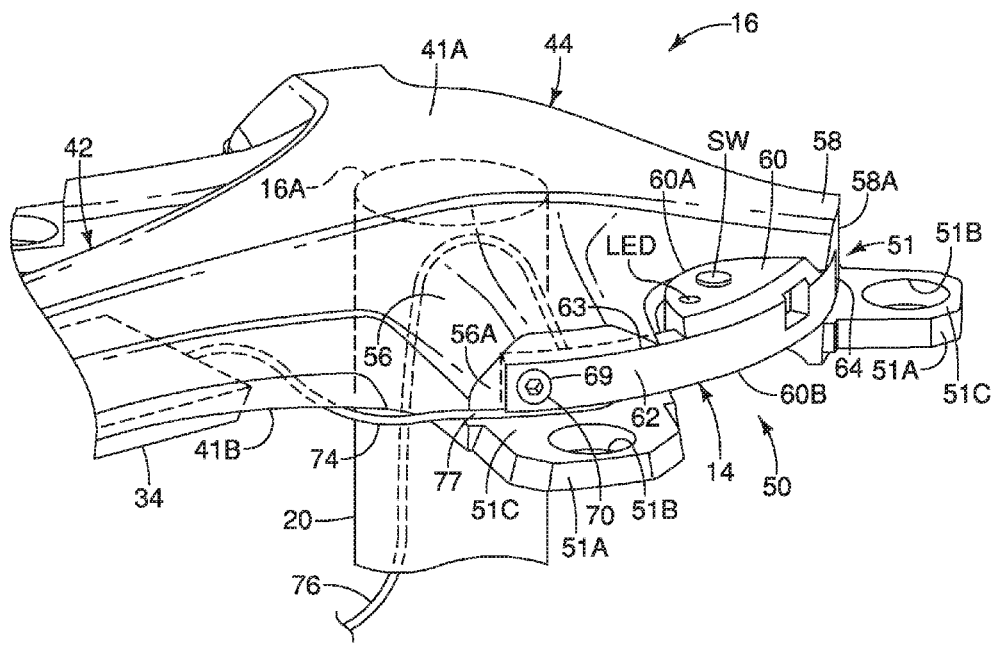
FIG. 7 is an outside perspective view of a portion of the right crank arm of the bicycle crank assembly illustrated in FIGS. 1 to 3, showing the attachment of the bicycle electrical unit on the sprocket mounting portion by a fixing bolt.
Figure 8:
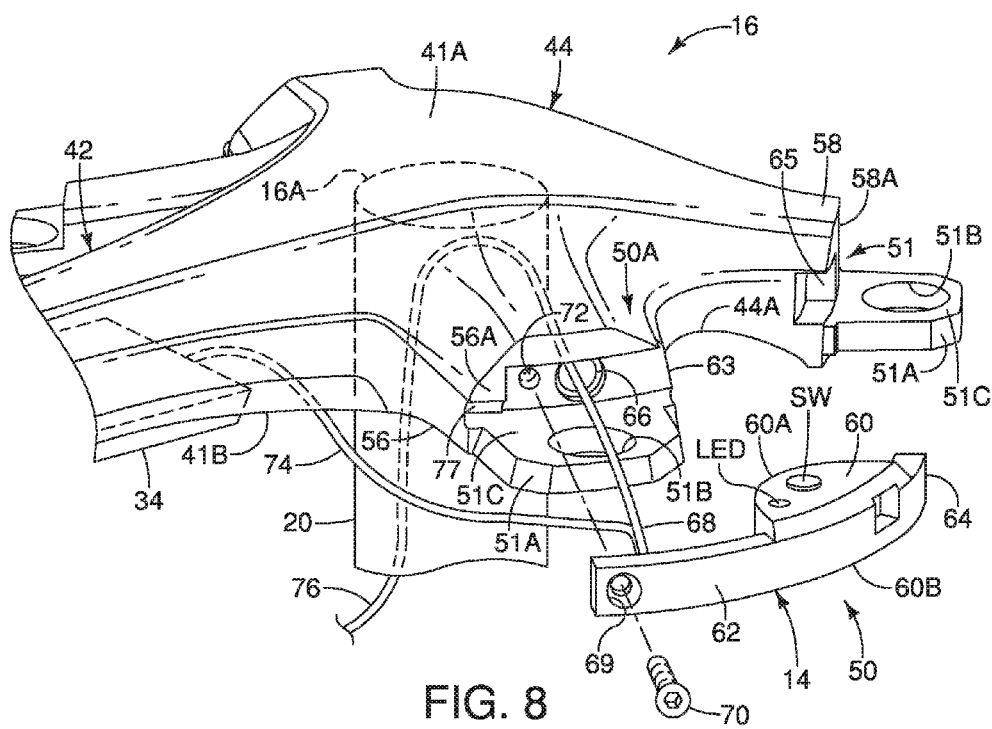
FIG. 8 is an outside perspective view of the portion of the right crank arm of the bicycle crank assembly illustrated in FIG. 7, but with the electrical unit exploded from the right crank arm to show the attachment of the bicycle electrical unit to the right crank arm.

As seen in FIGS. 7 and 8, the housing 60 is preferably made of a material, such as plastic, that allows magnetic flux to pass therethrough to activate the cadence sensor 31 for the pedaling of the first crank arm 16. The housing 60 is provided with a calibration switch SW and an indicator light LED that are disposed on an external surface of the housing 60. The housing 60 is also preferably provided with a charge receiver port USB. In the illustrated embodiment, the calibration switch SW, the indicator light LED and the charge receiver port USB are all electrically connected to a printed circuit board PCB that is electrically connected to the wireless communication unit 32. The calibration switch SW can be used to calibrate the first and second sensor circuits 34 and 38 using a calibration circuit of the printed circuit board PCB. The indicator light LED can be any light source, preferably a light emitting diode. The indicator light LED can use color codes to indicate various operating conditions of the electrical unit 14. For example, the indicator light LED can flash on and off during calibration of the first and second sensor circuits 34 and 38 via the calibration switch SW. Preferably, the indicator light LED is electrically connected to the battery unit 33 for indicating the power level of the battery unit 33. The processor, memory and the circuitry for controlling the indicator light LED can also be provided on the printed circuit board PCB. When the indicator light LED indicates a low power level for the battery unit 33, the rider may easily charge the electrical components of the electrical unit 14 via the charge receiver port USB. The charge receiver port USB receives a charger component for the electrical unit 14. Preferably, the charge receiver port USB is a universal serial bus.

As best seen in FIGS. 4 and 8, the electrical unit 14 further includes a first attachment part 62. As shown, the first attachment part 62 is a flange extending from one circumferential side of the housing 60. The electrical unit 14 further includes a second attachment part 64, which is also a flange, extending from a circumferential side of the housing 60 that is opposite from the first attachment part 62. Preferably, the first and second attachment parts 62 and 64 are integrally formed with a portion of the housing 60. The first and second attachment parts 62 and 64 serve to fixedly secure the electrical unit 14 to the first and second sprocket mounting arms 56 and 58 of the sprocket mounting portion 44. Specifically, the first attachment part 62 is disposed on the first sprocket mounting arm 56 of the at least one sprocket mounting arm at the sprocket mounting structure 51. Similarly, the second attachment part 64 is disposed on the second sprocket mounting arm 58 at the sprocket mounting structure 51.

Figure 6:
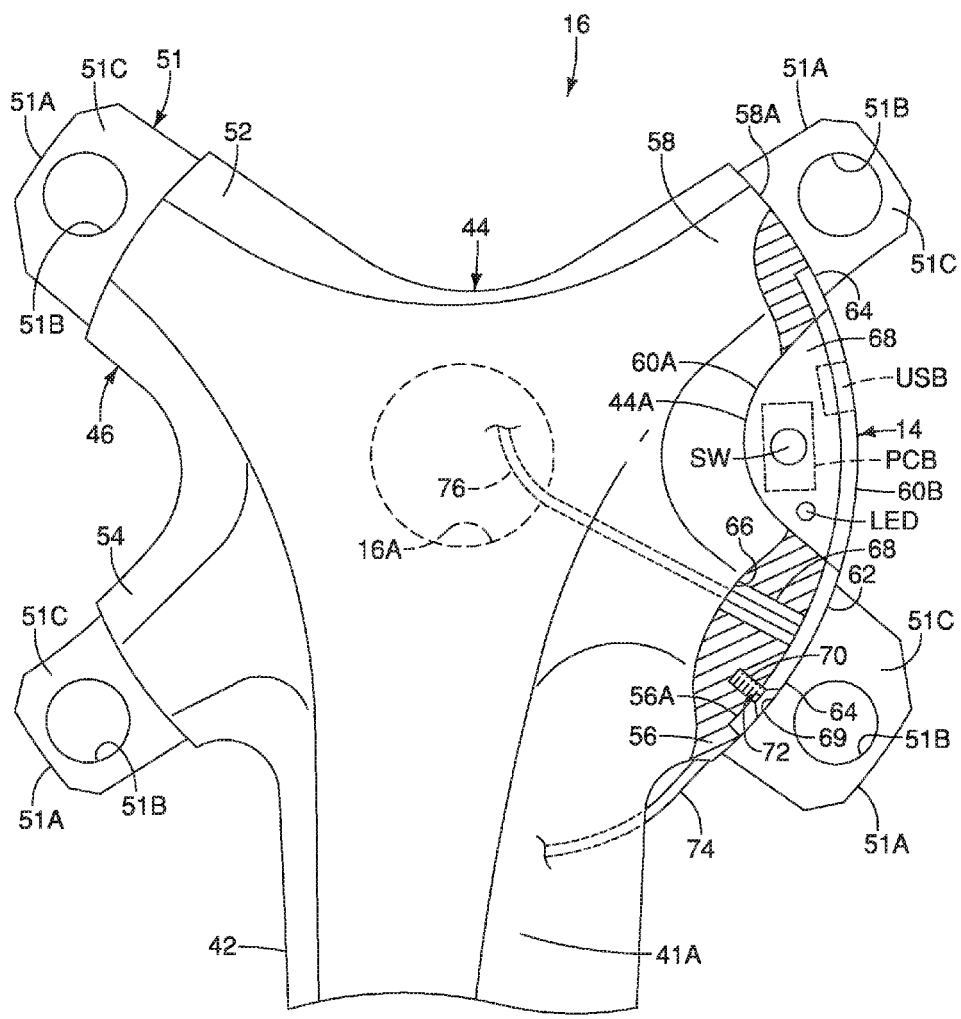
FIG. 6 is an outside elevational view of a portion of the right crank arm of the bicycle crank assembly illustrated in FIGS. 1 to 3, with a portion the sprocket mounting portion broken away to show the attachment of the bicycle electrical unit on the right crank arm.

Specifically, as best shown in FIGS. 6 to 8, the first attachment part 62 of the electrical unit 14 is mounted on the support surface 56A of the first sprocket mounting arm 56. Thus, the support surface 56A supports the first attachment part 62. In this way, when the bicycle sprocket S1 is installed on the sprocket mounting portion 44 of the first crank arm 16, the first attachment part 62 of the electrical unit 14 is disposed between the first sprocket mounting arm 56 and the bicycle sprocket S1. Similarly, the second attachment part 64 of the housing 60 is mounted on the support surface 58A of the second sprocket mounting arm 58. When the bicycle sprocket S1 is installed onto the sprocket mounting portion 44 of the first crank arm 16, the second attachment part 64 is disposed between the second sprocket mounting arm 58 and the bicycle sprocket S1.

As shown, when the electrical unit 14 is mounted to the sprocket mounting portion 44 by the first and second sprocket mounting arms 56 and 58, the housing 60 is disposed circumferentially between the first and second sprocket mounting arms 56 and 58. The housing 60 has a first curved side surface 60A and a second curved side surface 60B. The first curved side surface 60A substantially matches a curved edge 44A of the sprocket mounting portion 44 between the first and second sprocket mounting arms 56 and 58. The second curved side surface 60B of the housing 60 is integrally formed with the first and second attachment parts 62 and 64 as a one-piece member. Because the outer surfaces of the electrical unit 14 are operatively shaped to follow certain surfaces of the sprocket mounting portion 44, this arrangement allows for an aesthetically pleasing appearance when the electrical unit 14 is mounted on the first crank arm 16.

As best seen in FIG. 8, in the illustrated embodiment, the first support surface 56A of the first sprocket mounting arm 56 of the at least one sprocket mounting arm has a recess 63.

Figure 9:
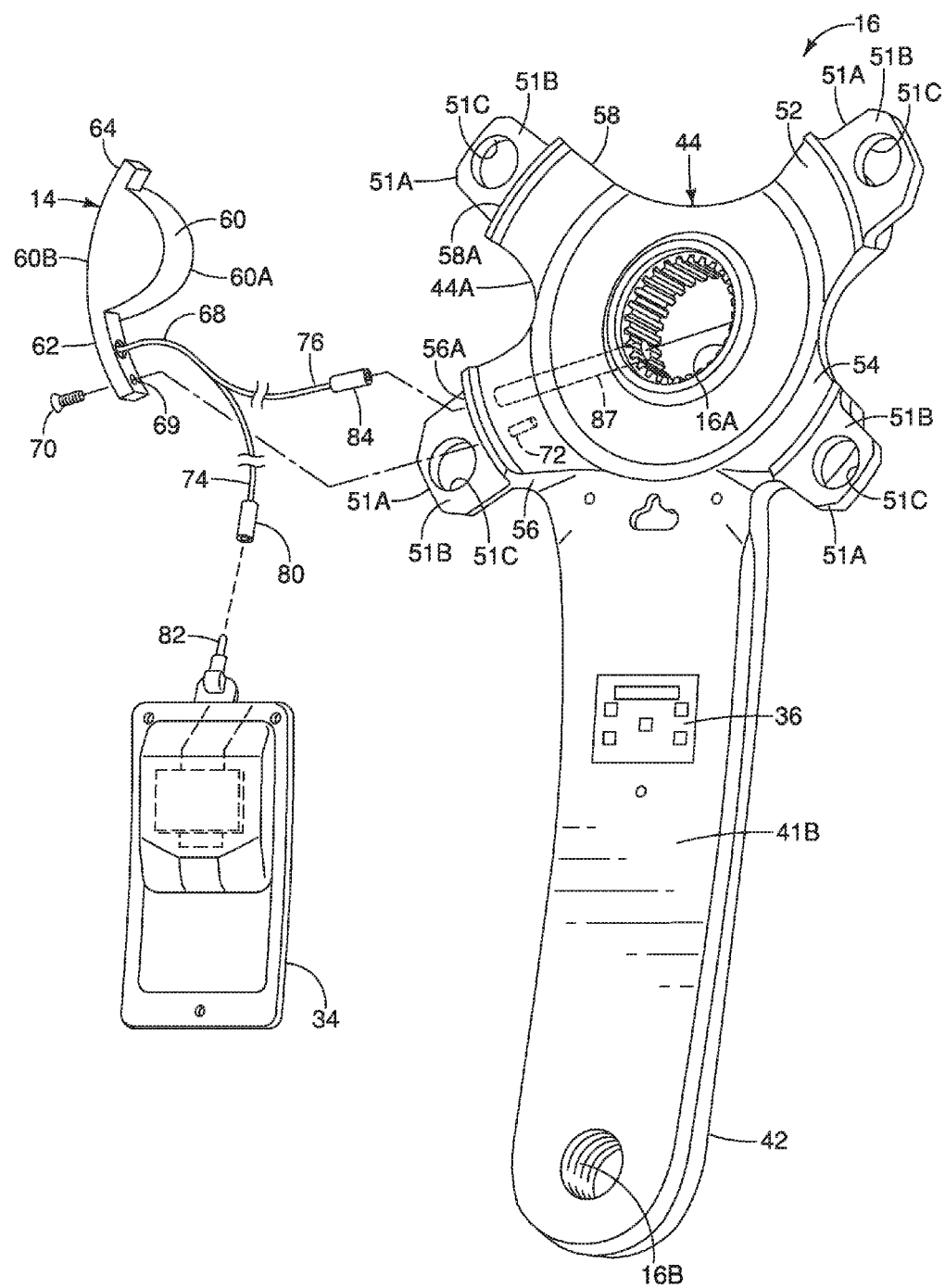
FIG. 9 is an exploded, inside perspective view of the right crank arm of the bicycle crank assembly illustrated in FIGS. 1 to 3, with a first sensor circuit of the sensor unit and the bicycle electrical unit exploded from the right crank arm.

Preferably, the recess 63 has a shape and depth that substantially aligns with the shape and thickness of the first attachment part 62 to accommodate the first attachment part 62. In this way, the first attachment part 62 is securely disposed in the recess 63. Further, as best seen in FIGS. 7 through 9, the first sprocket mounting arm 56 has an electrical connection opening 66. The electrical connection opening 66 is configured to receive an electrical conductive member 68 of the electrical unit 14. The electrical conductive member 68 extends through the electrical connection opening 66 from the electrical unit 14 to be electrically connected to the first and second sensor circuits 36 and 38. Thus, the electrical unit 14 has the electrical conductive member 68 that is electrically connected to the electrical unit 14. In the illustrated embodiment, the first support surface 58A of the second sprocket mounting arm 58 of the at least one sprocket mounting arm has a recess 65. Preferably, the recess 65 has a shape and depth that substantially aligns with the shape and thickness of the second attachment part 63 to accommodate the first attachment part 63. In this way, the second attachment part 63 is securely disposed in the recess 65.

In the illustrated embodiment, the electrical conductive member 68 is an electrical component that electrically connects the electrical unit 14 and the first and second sensor circuits 34 and 38. In other words, the first and second sensor circuits 36 and 38 are electrically connected to the at least one electrical component of the electrical unit 14 via the electrical conductive member 68. Thus, the electrical conductive member 68 transmits pedaling force information between the electrical unit 14 and the first and second sensor circuits 34 and 38. In the illustrated embodiment, the electrical conductive member 68 can be an electrical wire. Alternatively, the electrical conductive member 68 can also be one of a male and female connector.

As seen in FIGS. 7 and 8, the support surface 56A of the first sprocket mounting arm 56 has the electrical connection opening 66 that receives the electrical conductive member 68 of the electrical unit 14. Thus, the electrical connection opening 66 of the first sprocket mounting arm 56 is located at the distal end part 51A, and is disposed radially inward of the sprocket mounting structure 51. Preferably, the recess 63 of the support surface 56A has the electrical connection opening 66. However, the electrical connection opening 66 can be located offset of the support surface 56A to receive the electrical conductive member 68 as needed and/or desired.

In this way, when the first attachment part 62 of the electrical unit 14 is disposed on the support surface 56A, the first attachment part 62 overlies the recess 63 and the electrical connection opening 66. This arrangement allows for easy receipt of the electrical conductive member 68 by the electrical connection opening 66. Also, as previously stated, the bicycle sprocket S1 is mounted onto the sprocket support surface 51C of the first sprocket mounting arm 56. Thus, when the bicycle sprocket S1 is mounted onto the sprocket mounting structure 51 of the first sprocket mounting arm 56, the first attachment part 62 of the electrical unit 14 is disposed radially between the electrical connection opening 66 of the first support surface 56B and the bicycle sprocket S1.

In the illustrated embodiment, the first attachment part 62 has a first fastener opening 69 for receiving a fastener 70 therethrough. Thus, the first attachment part 62 receives the fastener 70. The first attachment part 62 of the electrical unit 14 is fixed to the first sprocket mounting arm 56 by the fastener 70. In the illustrated embodiment, the first support surface 56B of the first sprocket mounting arm 56 also has a second fastener opening 72. Specifically, the recess 63 of the first support surface 56B includes the second fastener opening 72 for receiving the fastener 70. The second fastener opening 72 is preferably a threaded bore and the fastener 70 is preferably a screw. When the first attachment part 62 of the electrical unit 14 is disposed onto the first support surface 56B of the first sprocket mounting arm 56, the second fastener opening 72 is aligned with the first fastener opening 69. The fastener 70 is received in the first and second fastener openings 69 and 72. In other words, the fastener 70 extends through the first and second fastener openings 69 and 72 to fixedly secure the first attachment part 62 of the electrical unit 14 to the first sprocket mounting arm 56. Optionally, although not shown, the second attachment part 64 of the electrical unit 14 can include a third fastener opening (not shown), while the second support surface 58B of the second sprocket mounting arm 58 can include a fourth fastener opening (not shown) for receiving a second fastener (not shown) therethrough, to fixedly secure the second attachment part 64 to the second support surface 58B.

Figure 10:
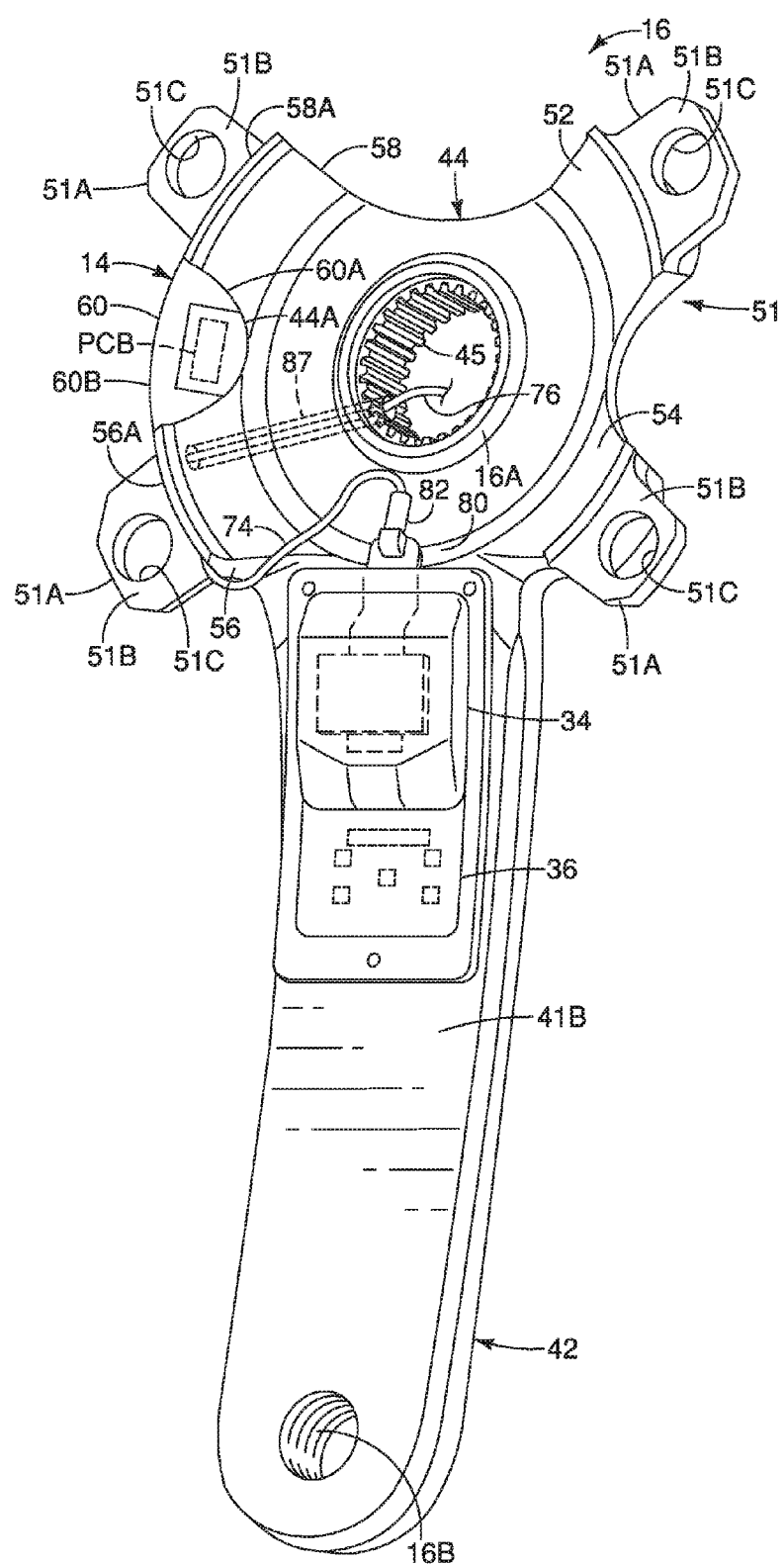
FIG. 10 is an inside perspective view of the right crank arm of the bicycle crank assembly illustrated in FIGS. 1 to 3, showing the bicycle electrical unit disposed on the sprocket mounting portion and the first sensor circuit mounted onto the crank portion.

The electrical connection between the electrical unit 14 and the first and second sensor circuits 34 and 38 will now be discussed in greater detail. In the illustrated embodiment, with reference to FIGS. 5 to 11, the electrical conductive member 68 of the electrical unit 14 is an electrical wire for electrically connecting the electrical unit 14 to the pedaling force detector 22. As best seen in FIGS. 8 and 9, the electrical conductive member 68 branches off into two electrical wires 74 and 76. The electrical wire 74 electrically connects the electrical unit 14 with the first sensor circuit 34 on the first crank arm 16. The electrical wire 76 electrically connects the electrical unit 14 with the second sensor circuit 38 of the second crank arm 18. As shown in FIG. 9, the electrical conductive member 68 extends from the housing 60 of the electrical unit 14 and then divides into the electrical wires 74 and 76. The electrical wire 74 fits into an elongated wire recess 77 that is located on an inside edge of the support surface 56A of the first sprocket mounting arm 56. The wire recess 77 is preferably located axially between the sprocket support surface 51C and the support surface 56A of the first sprocket mounting arm 56. As best seen in FIG. 10, the wire recess 77 preferably continues onto the inside surface of the first crank arm 16 and leads to a connector of the first sensor circuit 34. Thus, the electrical wire 74 extends through the wire recess 77 to connect with the first sensor circuit 34 on the first crank arm 16.

The electrical wire 76 extends through the electrical connection opening 66 that is located on the first support surface 56B of the first sprocket mounting arm 56. In the illustrated embodiment, as best seen in FIGS. 7 and 8, the electrical wire 76 then extends through the hollow crankshaft 20 to connect with the second sensor circuit 38 (not shown). In the first illustrated embodiment, the electrical conductive member 68 is directly connected to the printed circuit board PCB that is disposed inside the housing 60 of the electrical unit 14, as seen in FIG. 10.

Figure 11:
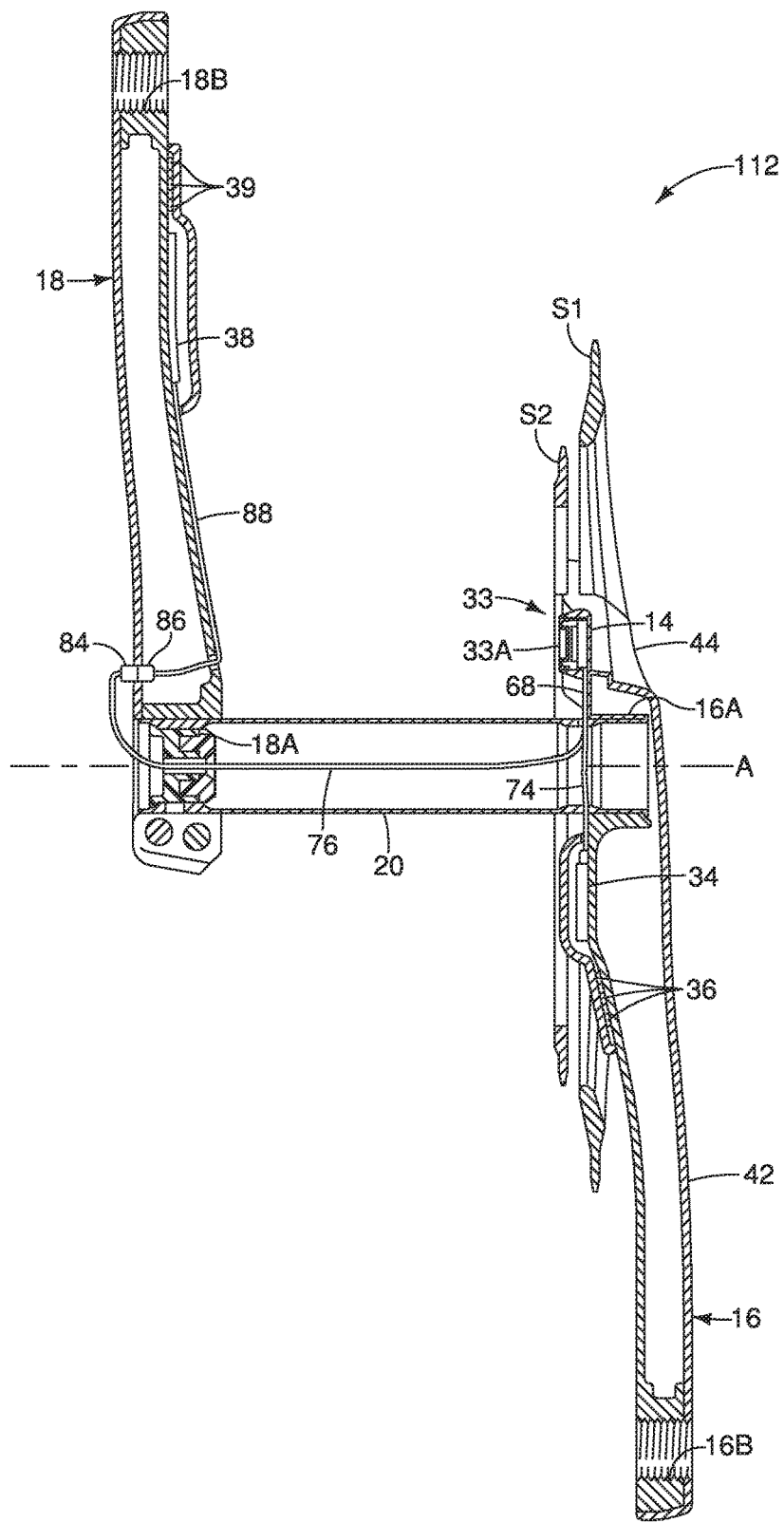
FIG. 11 is a cross-sectional view of the bicycle crank assembly illustrated in FIGS. 1 to 3 having a battery unit disposed on the sprocket mounting portion of the right crank arm as seen along section line 9-9 of FIG. 3.

In the illustrated embodiment, with reference to FIGS. 9 to 11, the electrical wire 74 includes an electrical connector 80 that electrically connects to an electrical connector 82 of the first sensor circuit 34. Similarly, as best shown in FIGS. 9 and 11, the electrical wire 76 includes an electrical connector 84 that mates with a corresponding electrical connector 86 that is disposed on the second crank arm 18. The electrical connector 86 is electrically connected to an electrical wire 88 that is electrically connected to the second sensor circuit 38. In this way, the electrical wire 76 extends through the crankshaft 20 to connect with the second sensor circuit 38. The electrical wires 74, 76, and 88 can be flexible printed boards (i.e., a plurality of electrical conductors bonded to a thin dielectric film). Alternatively, the electrical wires 74, 76, and 88 can be conventional wire harnesses. In this way, the first and second sensor circuits 34 and 38 are electrically connected to the at least one electrical component of the electrical unit 14 (e.g., the wireless communication unit 32 or the battery unit 33).

Referring now to FIG. 11, a first battery arrangement of the battery unit 33 on the bicycle crank assembly 12 will now be discussed. In the first embodiment, the battery unit 33 is supported by the electrical unit 14. The electrical unit 14 can be disposed on an outer surface of the electrical unit 14 or enclosed in the housing 60 of the electrical unit 14. Thus, the battery unit 33 is one of the at least one electrical components of the electrical unit 14. The battery unit 33 includes a battery 33A, which serves to supply power to the electrical components of the bicycle crank assembly 12 that are installed on the bicycle 10. The battery unit 33 is electrically connected to a main printed circuit board PCB. Preferably, the electrical unit 14 further includes a battery receiving structure (not shown) that is a recess in the electrical unit 14 configured to support the battery unit 33. The battery receiving structure can be an integral part of the electrical unit 14, a removable structure, or a part of the printed circuit board PCB. Preferably, the electrical unit 14 has a detachable cover (not shown) for retaining the battery 33A of the battery unit 33 in the battery receiving structure. In this way, the battery 33A of the battery unit 33 is detachably attached to the battery receiving structure. The battery 33A of the battery unit 33 can be, for example, a coin battery, a dry cell battery, and/or a rechargeable dry cell battery. Alternatively, power for the electrical components of the bicycle crank assembly 12 can also be provided by one or more solar cells that are affixed to the bicycle crank assembly 12. Alternatively, power for the electrical components of the bicycle crank assembly 12 can be generated from piezoelectric devices or any combination of batteries, solar cells, piezoelectric devices, and other suitable power sources.

Figure 12:
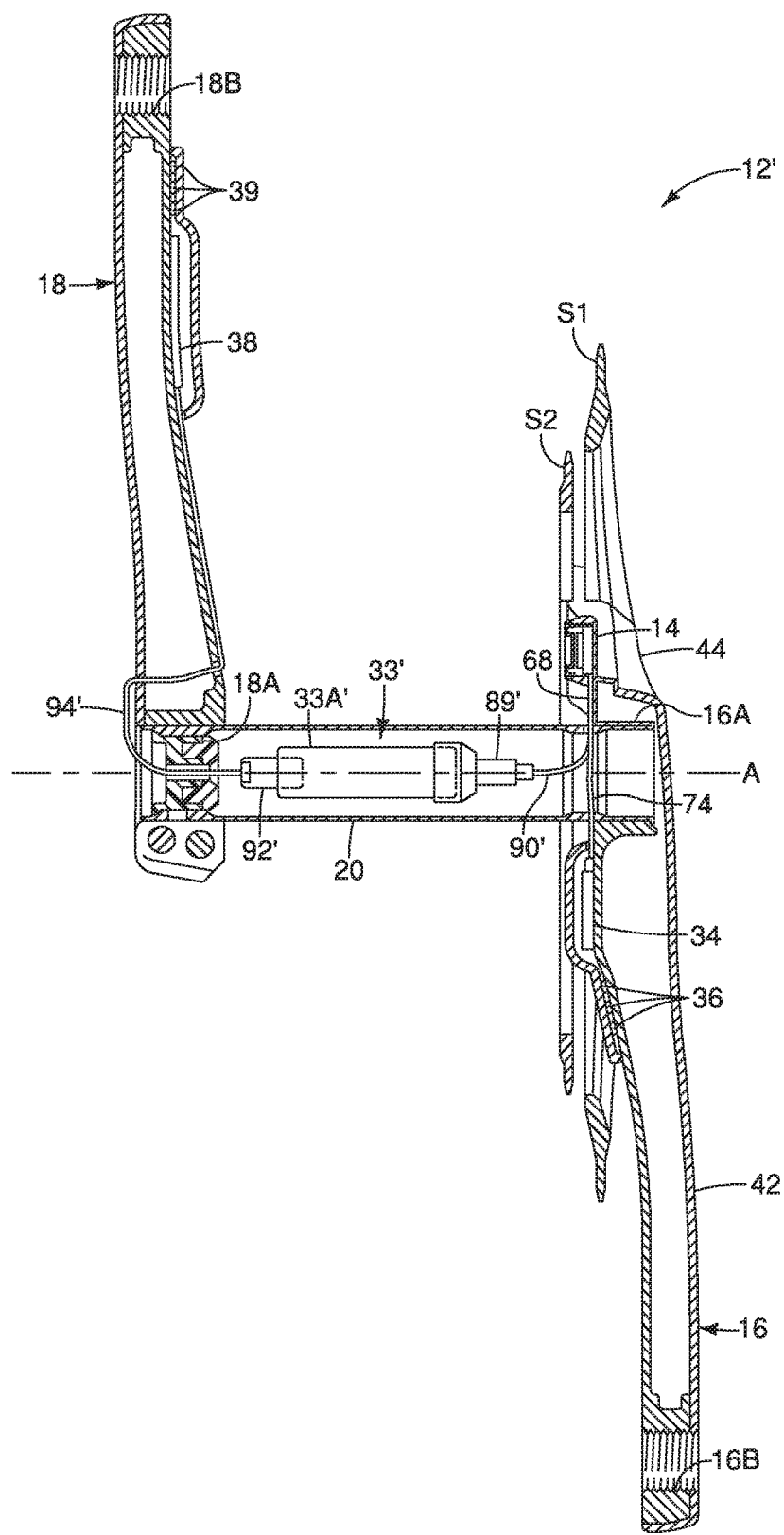
FIG. 12 is a cross-sectional perspective view of a part of a sprocket mounting portion and a part of a crankshaft in accordance with a first alternative arrangement of a bicycle crank assembly in which an electrical connection opening is offset from a support surface of a sprocket mounting arm.

Referring now to FIG. 12, an alternative bicycle crank assembly 12' is with an alternative battery arrangement. In FIG. 12, the bicycle crank assembly 12' is identical to the bicycle crank assembly 12 discussed above, except that a battery unit 33' is disposed inside the crankshaft 20, instead of being one of the electrical components of the electrical unit 14. Thus, in FIG. 12, all of the reference symbols for the parts of the bicycle crank assembly 12' that are identical to the parts of the bicycle crank assembly 12 will be given the same reference numerals as the first illustrated embodiment.

In the alternative illustrated embodiment, the battery unit 33' includes a battery 33A', a first battery connector 89', a first battery electrical wire 90', a battery board 92' and second battery electrical wire 94'. The first battery connector 89' is connected to a first end battery 33A'. Thus, the first battery connector 89' is disposed inside the crankshaft 20. The first battery connector 89' is connected to a first end of the first battery electrical wire 90', which has a connector at the other end that mates with the first electrical connector 80 that is disposed on the first crank arm 16. Although not shown, the first battery wire 90' is also has an electrical connector that is electrically connected to the second electrical conductive member 76 that extends from the electrical unit 14. Thus, the battery unit 33' is disposed on the electrical path connecting the second sensor circuit 38 and the electrical unit 14. The battery unit 33' is electrically connected at a second end to the battery board 92' (i.e., a printed circuit board that includes an electrical connector) that is also disposed inside the crankshaft 20. The battery board 92' is connected to the second sensor circuit 38 by the second battery electrical wire 94'. Thus, the battery unit 33' supplies power to the electrical components of the bicycle crank assembly 12 that are disposed on both the first and second crank arms 16 and 18. The battery unit 33' can be, for example a dry cell battery, and/or a rechargeable dry cell battery.

Figure 13:
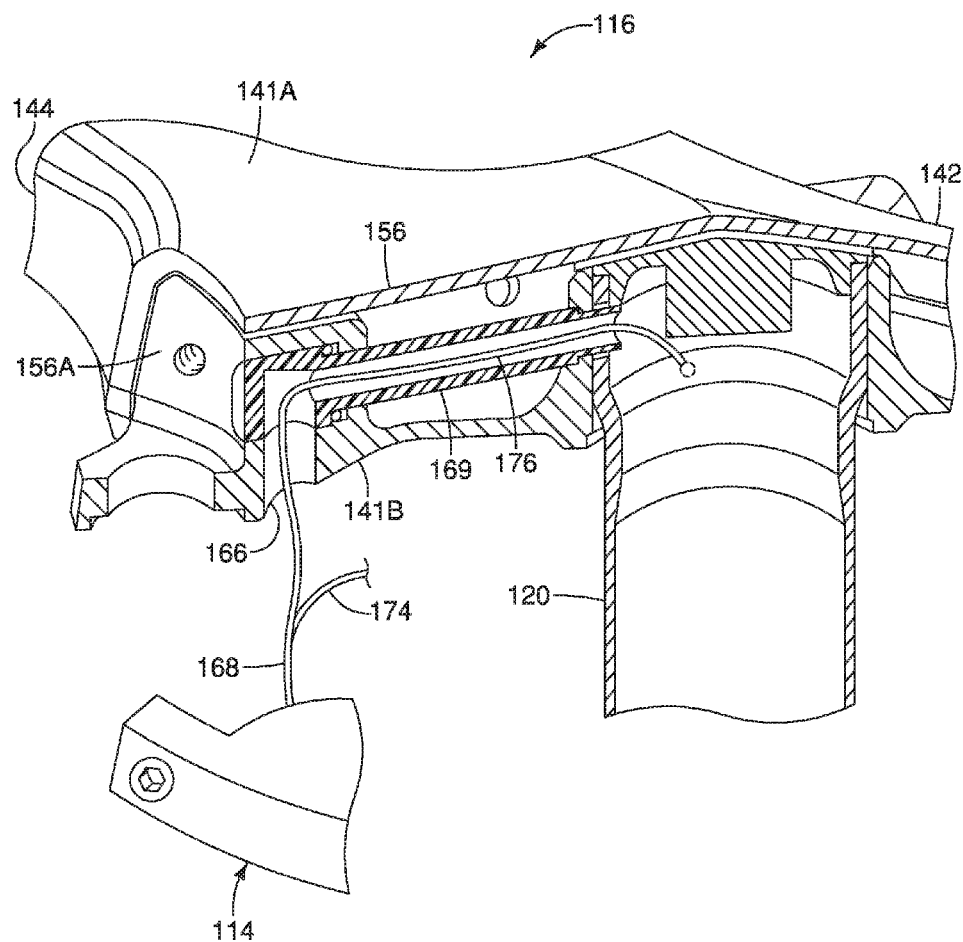
FIG. 13 is an exploded, outside perspective view of a right crank arm of a bicycle crank assembly in accordance with an alternative arrangement in which a sprocket mounting portion has an electrical connection opening with a female connector and the bicycle electrical unit has a male connector that is configured to mate with the female connector.

With reference now to FIG. 13, an alternative configuration of an electrical unit 114 and a first crank arm 116 will now be discussed. The electrical unit 114 and the first crank arm 116 are identical to the electrical unit 14 and the first crank arm 16, discussed above, except that the wiring path between the electrical unit 114 and the first crank arm 116 has been modified. The first crank arm 116 includes a crank portion 142 and a sprocket mounting portion 144 with a crankshaft 120 attached to the sprocket mounting portion 144. The sprocket mounting portion 144 has a plurality of sprocket mounting arms (only a portion of the first sprocket mounting arm 156 shown). As shown, the first crank arm 116 is identical to the first crank arm 16, except for an electrical connection opening 166 has been provided on an inside surface 141B, instead of on the support surface 156A.

Here, the electrical connection opening 166 is disposed on the first sprocket mounting arm 156 but offset from the first support surface 156A. As shown, the electrical connection opening 166 is disposed on the inside surface 141B of the first crank arm 116 for receiving the electrical wire 176 of the electrical conductive member 168 of the electrical unit 114. Thus, the electrical connection opening 166 of the first sprocket mounting arm 156 is located radially between the sprocket mounting structure 151 and the crank arm portion 142. The electrical conductive member 168 has an electrical wire 174 that is the same as the electrical wire 74. A guide member 169 is disposed in the first sprocket mounting arm 156 to guide the electrical wire 176. The guide member 169 is extended from the opening 166 to the crank shaft 120. The guide member 169 is made by a tube and made from synthetic resin.

Figure 14:
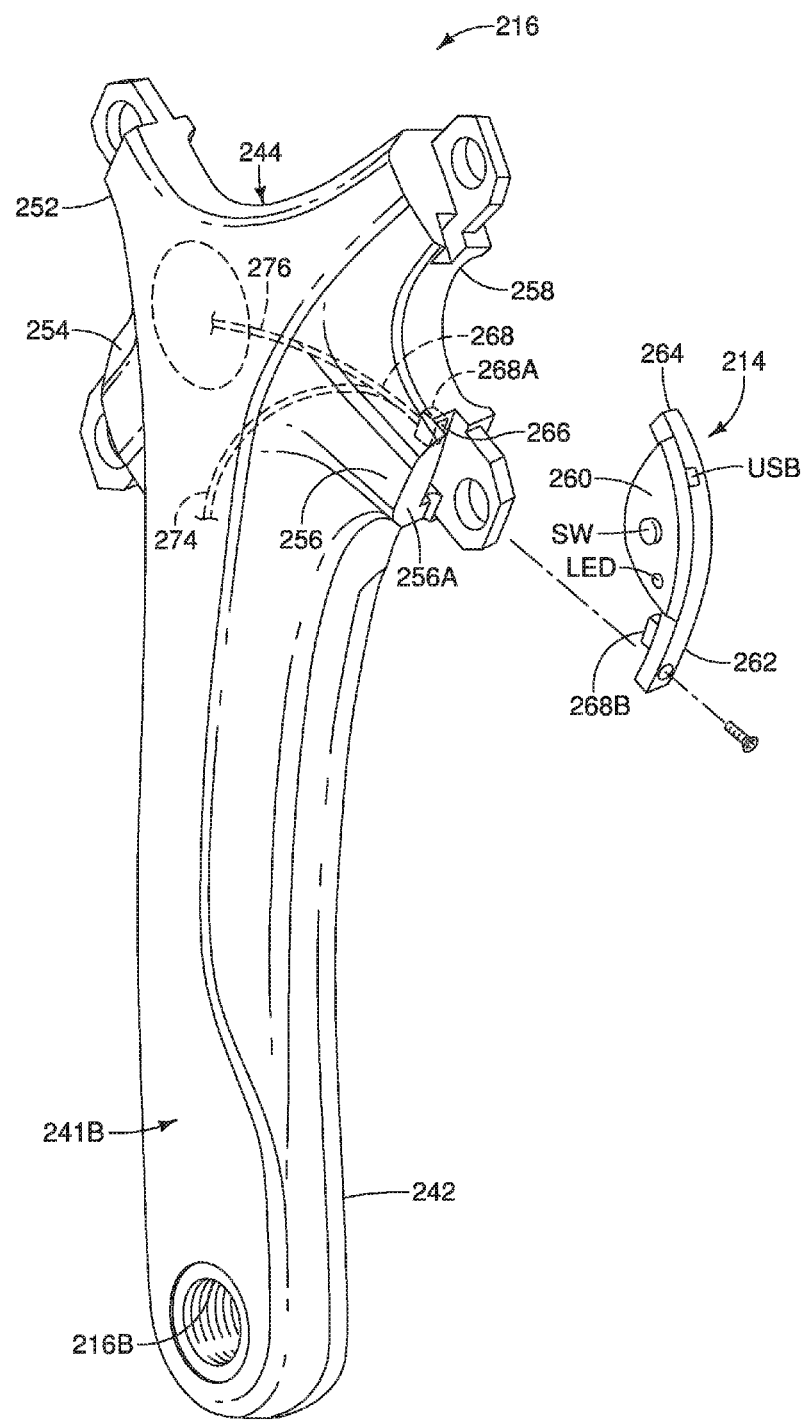
FIG. 14 is a cross-sectional view, similar to FIG. 11, of a bicycle crank assembly having a battery unit disposed inside a crankshaft.

With reference now to FIG. 14, an alternative configuration of an electrical unit 214 and a first crank arm 216 will now be discussed. The electrical unit 214 and the first crank arm 216 are identical to the electrical unit 14 and the first crank arm 16, discussed above, except that the wiring connection between the electrical unit 214 and the first crank arm 216 has been modified. The first crank arm 216 includes a crank portion 242 and a sprocket mounting portion 244. The sprocket mounting portion 244 has a plurality of sprocket mounting arms 252, 254, 256 and 258. As shown, the first crank arm 216 is identical to the first crank arm 16, except that the sprocket mounting arm 256 has a first electrical connector 268A mounted at its support surface 256A. The electrical unit 214 has a housing 260 with a first attachment part 262 and a second attachment part 264. Similar to the first embodiment, the housing 260 is provided with a calibration switch SW, an indicator light LED and a charge receiver port USB. The electrical unit 214 is identical to the electrical unit 14, except that a second electrical connector 268B is provided. The second electrical connector 268B is configured to mate with the first electrical connector 268A when the electrical unit 214 is mounted on the sprocket mounting portion 244 in the same manner as the first embodiment. In this alternate configuration, the first electrical connector 268A of the first sprocket mounting arm 256 includes one of a female connector and a male connector that is disposed at the electrical connection opening 266. On the other hand, the electrical conductive member 268 of the electrical unit 214 is the other of a female connector and a male connector and is configured to connect with the female conductor. In the illustrated embodiment, the first electrical connector 268A of the first sprocket mounting arm 256 is a female connector disposed at the support surface 256A. The first electrical connector 268A has an electrical conductive member 268 connected thereto. The electrical conductive member 268 includes electrical wires 274 and 276. As the specific structure of the male and female connectors is not important, it will not be further discussed herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle crank assembly. Accordingly, these directional terms, as utilized to describe the bicycle crank assembly should be interpreted relative to a bicycle in an upright riding position on a horizontal surface and that is equipped with the bicycle crank assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle electrical unit for a bicycle crank assembly, the bicycle electrical unit comprising:
   a housing configured to be mounted on an outer surface of a crank arm, the housing being a separate member from the crank arm. the housing being configured to be attached circumferentially between a first sprocket mounting arm and a second sprocket mounting arm of a sprocket mounting portion of the crank arm with respect to a rotational axis of the crank arm, the first sprocket mounting arm being a sprocket mounting arm that is disposed directly adjacent to a crank portion of the crank arm that has an opening for receiving a bicycle pedal;
   an indicator light that is provided with the housing;
   at least one strain sensor configured to be disposed on the outer surface of the crank arm, and configured to detect a pedaling force applied to the crank arm;
   a wireless communication unit enclosed in the housing and being electrically connected to the at least one strain sensor by at least one electrical wire to receive information transmitted by the at least one strain sensor; and
   a charge receiver port provided on the housing.

2. The bicycle electrical unit according to claim 1, further comprising
   a battery unit housed in the housing.

3. The bicycle electrical unit according to claim 1, further comprising
   a battery unit configured to be disposed inside of a crankshaft.

4. The bicycle electrical unit according to claim 1, further comprising
   at least one cadence sensor.

5. The bicycle crank arm assembly according to claim 1, wherein
   the charge receiver port charges the battery unit which supplies electrical power to at least one strain sensor and the wireless communication unit.

6. The bicycle crank arm assembly according to claim 1, wherein
   the charge receiver port, the indicator light and the wireless communication unit are electrically connected to a printed circuit board that is housed in the housing.

7. The bicycle crank arm assembly according to claim 1, wherein
the indicator light indicates a condition of the at least one strain sensor.

8. The bicycle crank arm assembly according to claim 1, wherein
the housing has a length that is less than a distance between the first and second crank arms as measured in a circumferential direction with respect to the rotational axis of the crank arm.

9. A bicycle crank arm assembly comprising:
a crank arm;
a housing mounted on an outer surface of the crank arm, the housing being a separate member from the crank arm, the housing being attached circumferentially between a first sprocket mounting arm and a second sprocket mounting arm of a sprocket mounting portion of the crank arm with respect to a rotational axis of the crank arm, the first sprocket mounting arm being a sprocket mounting arm that is disposed directly adjacent to a crank portion of the crank arm that has an opening for receiving a bicycle pedal;
an indicator light that is provided with the housing;
at least one strain sensor disposed on the outer surface of the crank am and configured to detect and transmit a pedaling force applied to the crank arm;
a wireless communication unit enclosed in the housing and being electrically connected to the at least one strain sensor by at least one electrical wire to receive information transmitted by the at least one strain sensor; and
a charge receiver port provided on the housing.

10. The bicycle crank arm assembly according to claim 9, further comprising
a battery unit housed in the housing.

11. The bicycle crank arm assembly according to claim 9, further comprising
a battery unit configured to be disposed inside of a crankshaft.

12. The bicycle crank arm assembly according to claim 9, further comprising
at least one cadence sensor.

13. bicycle crank assembly comprising:
a crank arm;
a crankshaft connected to the crank arm;
a charge receiver port disposed on the crank arm;
a housing configured to mounted on an outside surface of a crank arm, the housing being a separate member from the crank arm, the housing being attached circumferentially between a first sprocket mounting arm and a second sprocket mounting arm of a sprocket mounting portion of the crank arm with respect to a rotational axis of the crank arm, the first sprocket mounting arm being a sprocket mounting arm that is disposed directly adjacent to a crank portion of the crank arm that has an opening for receiving a bicycle pedal;
at least one strain sensor configured to be disposed on the outer surface of the crank arm and configured to detect a pedaling force applied to the crank arm;
a battery unit disposed inside the crankshaft, the battery unit having at least one battery electrical wire that is electrically connected to the charge receiver port;
a wireless communication unit enclosed in the housing and being electrically connected to the at least one strain sensor by at least one electrical wire to receive information transmitted by the at least one strain sensor; and
an indicator light electrically connected to the battery unit for indicating a state of the battery unit.

* * * * *